(12) United States Patent
Wakou et al.

(10) Patent No.: US 7,274,151 B2
(45) Date of Patent: Sep. 25, 2007

(54) DRIVE DEVICE AND DRIVE METHOD OF LIGHT EMITTING ELEMENTS

(75) Inventors: Shingo Wakou, Yonezawa (JP); Masato Togashi, Yonezawa (JP); Naoki Yazawa, Yonezawa (JP)

(73) Assignee: Tohoku Pioneer Corporation, Yamagata (JP)

( * ) Notice: Subject to any disclaimer, the term of this patent is extended or adjusted under 35 U.S.C. 154(b) by 91 days.

(21) Appl. No.: 11/080,970

(22) Filed: Mar. 16, 2005

(65) Prior Publication Data

US 2005/0206325 A1    Sep. 22, 2005

(30) Foreign Application Priority Data

Mar. 19, 2004    (JP)    ............................. 2004-079653

(51) Int. Cl.
*G09G 3/10* (2006.01)

(52) U.S. Cl. ................. 315/169.3; 315/169.1; 345/82

(58) Field of Classification Search .. 315/169.1–169.4; 345/76–92
See application file for complete search history.

(56) References Cited

U.S. PATENT DOCUMENTS

| | | | | |
|---|---|---|---|---|
| 6,028,573 | A * | 2/2000 | Orita et al. .................... | 345/66 |
| 6,756,738 | B2 * | 6/2004 | Maede et al. ............. | 315/169.1 |
| 6,985,124 | B1 * | 1/2006 | Nogawa ........................ | 345/55 |
| 7,079,092 | B2 * | 7/2006 | Tanghe et al. ................ | 345/76 |
| 7,088,321 | B1 * | 8/2006 | Parker ........................... | 345/83 |
| 2001/0024085 | A1 * | 9/2001 | Abe et al. .................... | 313/495 |
| 2003/0006747 | A1 * | 1/2003 | Jaussi et al. ................. | 323/315 |
| 2003/0151374 | A1 * | 8/2003 | Maede et al. ............. | 315/169.3 |
| 2003/0160744 | A1 * | 8/2003 | Yoshida et al. ................ | 345/82 |
| 2003/0184237 | A1 * | 10/2003 | Togashi et al. .......... | 315/169.3 |
| 2004/0155844 | A1 * | 8/2004 | Stopa .......................... | 345/82 |
| 2005/0030257 | A1 * | 2/2005 | Greuel et al. ................. | 345/55 |
| 2005/0168162 | A1 * | 8/2005 | Inoue ......................... | 315/225 |

FOREIGN PATENT DOCUMENTS

JP    2002-43053    2/2002

* cited by examiner

*Primary Examiner*—Douglas W. Owens
*Assistant Examiner*—Tung X Le
(74) *Attorney, Agent, or Firm*—Westerman, Hattori, Daniels & Adrian, LLP.

(57) ABSTRACT

The anode sides of respective EL elements E1-E4 constituting icons are connected to a first potential V1, the cathode sides of the EL elements E1-E4 are connected to current absorption sides of constant current sources I1-I4, and current output sides of the constant current sources are connected to a second potential V2 whose potential is lower than that of the first potential via light emission control switches S11-S14. Current regulating resistors R101-R104 are connected in parallel corresponding to the respective EL elements E1-E4, and therefore by appropriately selecting the resistance values of the current regulating resistors R101-R104, light emission intensities of the respective EL elements E1-E4 constituting icons can be regulated appropriately. During an all extinction period during which the respective EL elements E1-E4 are all extinguished, an analog switch S201 is turned off, and an analog switch S202 is turned on. Thus, the anode sides of all EL elements E1-E4 become ground potential, and a reverse bias voltage is applied to all EL elements E1-E4. By periodic applying of this reverse bias voltage, the light emission lifetimes of the EL elements E1-E4 can be prolonged.

10 Claims, 13 Drawing Sheets

DRIVE DEVICE AND DRIVE METHOD OF LIGHT EMITTING ELEMENTS

BACKGROUND OF THE INVENTION

1. Field of the Invention

The present invention relates to a drive device of a light emitting element in which a current drive type light emitting element is employed, and particularly to a drive device constructed in such a way that the light emitting element is individually driven to be lit by a combination of a constant current source and a current regulating resistor and a drive method thereof.

2. Description of the Related Art

Demand for a display panel which has a high definition image display function and a thin shape and which can realize low power consumption is increasing due to the spread of portable telephones, portable digital assistants (PDAs), and the like, and conventionally a liquid display panel has been adopted in many products as a display panel which meets requirements therefor. Meanwhile, recently, an organic EL (electroluminescent) element which makes the best use of a property of being a self light emitting type display element is also adopted in the above-mentioned some products, and this has attracted attention as a next generation display panel which replaces a conventional liquid display panel. This is because of backgrounds one of which is that by employing, in the light emitting layer of the organic EL element, an organic compound which enables an excellent light emission characteristic to be expected, a high efficiency and a long life which can be equal to practical use have been advanced.

The organic EL element is constructed basically in such a way that a transparent electrode for example by ITO, an organic EL medium, and a metallic electrode are laminated one by one on a transparent substrate. The organic EL medium may be a single layer of an organic light emitting layer, a medium of double layer structure composed of an organic positive hole transport layer and an organic light emitting layer, a medium of triple layer structure composed of an organic positive hole transport layer, an organic light emitting layer, and an organic electron transport layer, or a medium of multilayer structure in which an injection layer of electron or positive hole is inserted into an appropriate portion among these layers.

The above-described organic EL element can be electrically replaced by a structure composed of a light emitting component having a diode characteristic and a parasitic capacitance component which is connected in parallel to this light emitting component, and thus the organic EL element can be said to be a capacitive light emitting element. When a light emission drive voltage is applied to this organic EL element, at first, electrical charges corresponding to the electric capacity of this element flow into the electrode as a displacement current and are accumulated. It can be considered that when the drive voltage then exceeds a determined voltage (light emission threshold voltage=Vth) peculiar to this element, current begins to flow from one electrode (anode electrode side of the diode component) to an organic layer constituting the light emitting layer so that the element emits light at an intensity proportional to this current.

As a display panel in which such organic EL elements (hereinafter simply referred to also as EL elements) are employed, a panel of a dot matrix structure in which EL elements having approximately the same light emitting area are arranged respectively at intersection positions between drive lines and scan lines has been provided, and by this panel, various characters, images, and the like can be expressed through lighting patterns of dots. Meanwhile, in the above-mentioned portable telephones, PDAs, and the like, it is necessary for specific display patterns such as remaining power of a battery, a reception signal intensity, other incoming call/message display to be displayed on a part of the display panel.

These specific patterns are displayed utilizing icon patterns formed by allowing a transparent electrode by ITO to correspond to the display patterns, without utilizing the above-mentioned dot matrix. In the case where such icon patterns are formed, resolution can be improved more than that of a display by the dot matrix. The structure of the display panel in which a dot matrix area and an icon pattern area are formed on one panel surface while utilizing the organic EL elements as display elements is disclosed in Japanese Patent Application Laid-Open No. 2002-43053 that the present applicant has already filed.

FIG. 1 schematically shows an example of a display panel in which the icon patterns are formed and a function of a driver which supplies light emission drive power to these respective icon patterns. Reference numeral 1 shows a display panel, and in this display panel 1, for example, icon patterns displaying remaining power of a battery, a reception signal intensity, and the like are formed. These icon patterns are formed by allowing a transparent electrode by ITO to correspond to the display patterns of icons as described above.

That is, in a left side in FIG. 1, icon patterns showing the remaining power of a battery composed of four islands are formed, and in a state shown in FIG. 1, as shown by hatching the icon patterns, a state in which the remaining power of the battery is at second level is shown. In a right side thereof, it is shown that an icon pattern showing an antenna is in a lighting state, and in a further right side thereof, icon patterns including lines whose lengths in the vertical direction are different from one another are arranged. These show icon patterns showing a reception signal intensity, and the state shown in FIG. 1 shows a state in which the reception signal intensity which is shown by three levels is maximum.

Light emission drive power is supplied to the respective icon patterns via data lines (shown by thin lines in the drawing) formed by the same ITO on the display panel 1. Common scan lines (shown by dashed lines in the drawing) are arranged on the display panel 1, and back surface electrodes (the above-mentioned metallic electrode) of the respective icon patterns are mutually connected via these common scan lines.

Reference numeral 2 denotes a flexible printed circuit (FPC) in which respective lead lines are connected to the data lines and the common scan lines for example via an anisotropic conducting film (ACF) on an end portion of the display panel 1, and the other end portion of this flexible circuit substrate 2 is connected to a driver IC shown by reference numeral 3. The driver IC 3 is divided into a data side driver 3a and a scan side driver 3b, and the data side driver 3a is constructed such that necessary currents can be supplied in response to areas of the icon patterns on the display panel 1, respectively.

That is, a unit area for the icon patterns is considerably large compared to a dot pattern arranged in a matrix pattern, and the areas thereof considerably differ in accordance with the patterns. Further, there is a case where emission colors of organic EL elements constituting icons differ from one another, and thus light emission efficiencies thereof differ from one another, whereby large differences occur in the values of drive currents necessary for driving and lighting the respective icons.

FIG. 2 shows an example in which due to the above-described actual conditions, where one constant current source is a unit, two or three constant current sources are combined as the need arises so that current values necessary for driving and lighting the respective icons are obtained. In FIG. 2, reference numeral 1 shows the display panel as shown in accordance with FIG. 1, and E1-E11 show icon patterns one by one arranged on this display panel 1. For example, E1, E2, E3, . . . suppose the respective icon patterns showing the remaining power of the battery shown in FIG. 1, E5 supposes the icon pattern showing the shape of the antenna, and further E11 supposes the icon pattern of a horned moon figure.

Respective drive currents are supplied from the constant current sources to these respective icons E1-E11 via respective drive switches Sa1-Sa11 in the data side driver 3a and a scan switch Sk1 in the scan side driver 3b. In this case, to the respective icons E1, E2, E3, . . . which show the remaining power of the battery, respective drive currents are independently supplied from the respective constant current sources I1, I2, I3, . . . Since the light emitting area of the icon E5 showing the shape of an antenna is large, current from two constant current sources I5, I6 is supplied. Further, since the light emitting area of the icon E11 of the horned moon figure is the largest, current from three constant current sources I16-I18 is supplied.

In this case, although for example the icons E1, E2 showing for example the remaining power of the battery have a rectangular shape and the same area together, since their icon light emitting colors are different, a measure is taken where for example supply time of drive current for example in one frame period is controlled to substantially make the light emission intensities even. Further, similarly, a measure is taken where supply times of drive currents are appropriately controlled in response to area ratios of respective icons. Such a manner of performing time gradation is schematically shown by the lengths of white portions showing the respective constant current sources in the data side driver 3a in FIG. 1. In other words, hatched portions show non-supply time (current shutting off period) of drive current from the respective constant current sources.

As described above, in order to drive and light the icon patterns respectively at appropriate intensities at a good balance, it is necessary to calculate the number of constant current sources by a unit of one constant current source as described above, preferably a unit of 0.5 constant current sources, and also to regulate current supply times (lighting time rates) supplied from the constant current sources. Further, in the case where multilevel dimmer control is to be realized by lighting times for all icons, lighting times of the respective icons have to be divided into smaller pieces, resulting in extremely complex control.

Such an appropriate allotment for the constant current sources is normally performed by setting registers in the driver IC or the like. When products in which light emitting modules are loaded are different, it also is normal that icon patterns are different, and a custom (exclusive use) driver IC is needed for each product. Therefore, preparing a custom IC as a driver for each light emitting module directly causes an increase in cost.

Meanwhile, regarding the organic EL element, it has been known that the light emission lifetime of the EL element can be prolonged by sequentially applying a reverse voltage (reverse bias voltage) which does not contribute to a light emission operation, and this is disclosed for example in Japanese Patent Application Laid-Open No. Hei 11-8064 and the like.

SUMMARY OF THE INVENTION

The present invention has been developed as attention to the conventional problem that respective custom ICs are needed corresponding to respective light emitting modules as described above has been paid, and it is a first object of the present invention to provide a drive device and a drive method in which for example by utilizing an all-purpose driver IC and taking some measure for it, appropriate drive currents responsive to respective icons can be supplied.

In addition, it is a second object of the present invention to provide a drive device and a drive method in which a reverse bias voltage can be applied effectively during a non-light emission period of each icon so that light emission lifetime of the element can be prolonged.

One form of a drive device of a light emitting element according to the present invention made to solve the above-described first object is a drive device of a light emitting element having a structure in which a light emitting element, a constant current source, and a light emission control switch are connected in series between a first potential and a second potential whose electrical potential is lower than the first potential in any one order of (1) the light emitting element, the constant current source, and the light emission control switch, (2) the light emitting element, the light emission control switch, and the constant current source, (3) the constant current source, the light emitting element, and the light emission control switch, wherein at least one current regulating resistor is connected in parallel to the light emitting element for regulating the current value flowing in the light emitting element.

In the above-described structure, a drive device according to the present invention made to solve the above-described second object is constructed in such a way that the light emitting element has a diode characteristic and that a reverse bias applying switch is provided in the anode side of the light emitting element so that the anode side of the light emitting element is switched and connected to a third potential whose electrical potential is lower than that of the first potential.

Another one form of a drive device of a light emitting element according to the present invention made to solve the first object is a drive device of a light emitting element having a structure in which a light emitting element, a constant current source, and a light emission control switch are connected in series between a first potential and a second potential whose electrical potential is lower than the first potential in any one order of (4) the light emission control switch, the light emitting element, and the constant current source, (5) the light emission control switch, the constant current source, and the light emitting element, (6) the constant current source, the light emission control switch, and the light emitting element, wherein at least one current regulating resistor is connected in parallel to the light emitting element for regulating the current value flowing in the light emitting element.

In the above-described structure, a drive device according to the present invention made to solve the second object is constructed in such a way that the light emitting element has a diode characteristic and that a reverse bias applying switch is provided in the cathode side of the light emitting element so that the cathode side of the light emitting element is switched and connected to a fourth potential whose electrical potential is higher than that of the second potential.

One aspect of a drive method of a light emitting element according to the present invention made to solve the first object is a drive method of a light emitting element having a structure in which a light emitting element, a constant current source, and a light emission control switch are connected in series between a first potential and a second potential whose electrical potential is lower than the first potential in any one order of (1) the light emitting element, the constant current source, and the light emission control switch, (2) the light emitting element, the light emission control switch, and the constant current source, (3) the constant current source, the light emitting element, and the light emission control switch, wherein the resistance value of a current regulating resistor connected in parallel to the light emitting element is selected so that the light emission drive current given to the light emitting element is regulated.

A drive method of a light emitting element according to the present invention which is further made to solve the second object while adopting the above-described drive method is characterized in that by switching and connecting the anode side of the light emitting element having a diode characteristic to a third potential whose electrical point is lower than the first potential in a non-lighting state of the light emitting element in which the light emission control switch is controlled to be turned off, a reverse bias voltage is applied to the light emitting element.

Another one aspect of a drive method of a light emitting element according to the present invention made to solve the first object is a drive method of a light emitting element having a structure in which a light emitting element, a constant current source, and a light emission control switch are connected in series between a first potential and a second potential whose electrical potential is lower than the first potential in any one order of (4) the light emission control switch, the light emitting element, and the constant current source, (5) the light emission control switch, the constant current source, and the light emitting element, (6) the constant current source, the light emission control switch, and the light emitting element, wherein the resistance value of a current regulating resistor connected in parallel to the light emitting element is selected so that the light emission drive current given to the light emitting element is regulated.

A drive method of a light emitting element according to the present invention which is further made to solve the second object while adopting the above-described drive method is characterized in that by switching and connecting the cathode side of the light emitting element having a diode characteristic to a fourth potential whose electrical point is higher than the second potential in a non-lighting state of the light emitting element in which the light emission control switch is controlled to be turned off, a reverse bias voltage is applied to the light emitting element.

DESCRIPTION OF THE PREFERRED EMBODIMENTS

Figure 1:
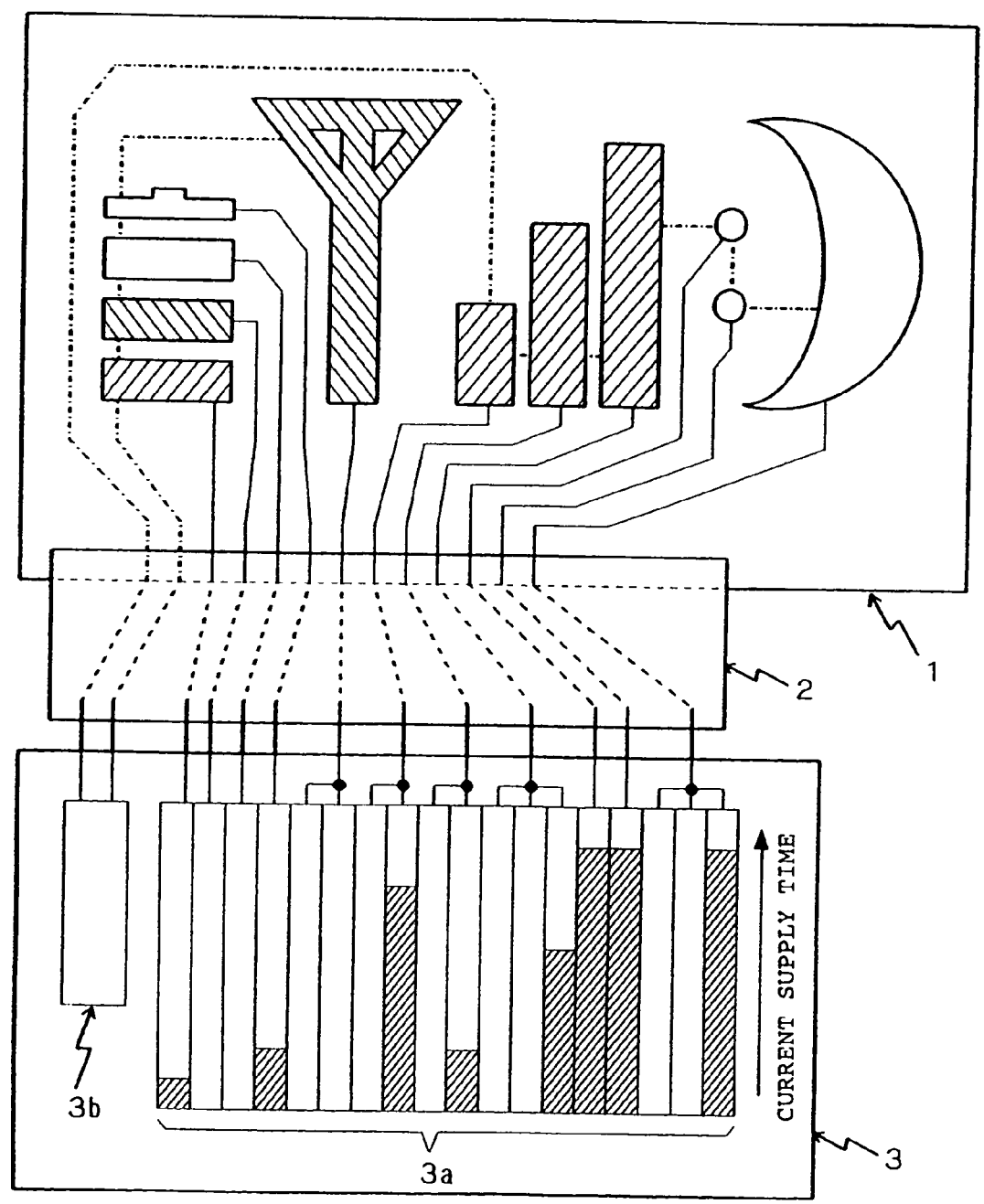
FIG. 1 is a schematic view explaining an example of a display panel in which icon patterns are formed and a function of a driver IC which supplies light emission drive power to each of these icon patterns.
Figure 2:
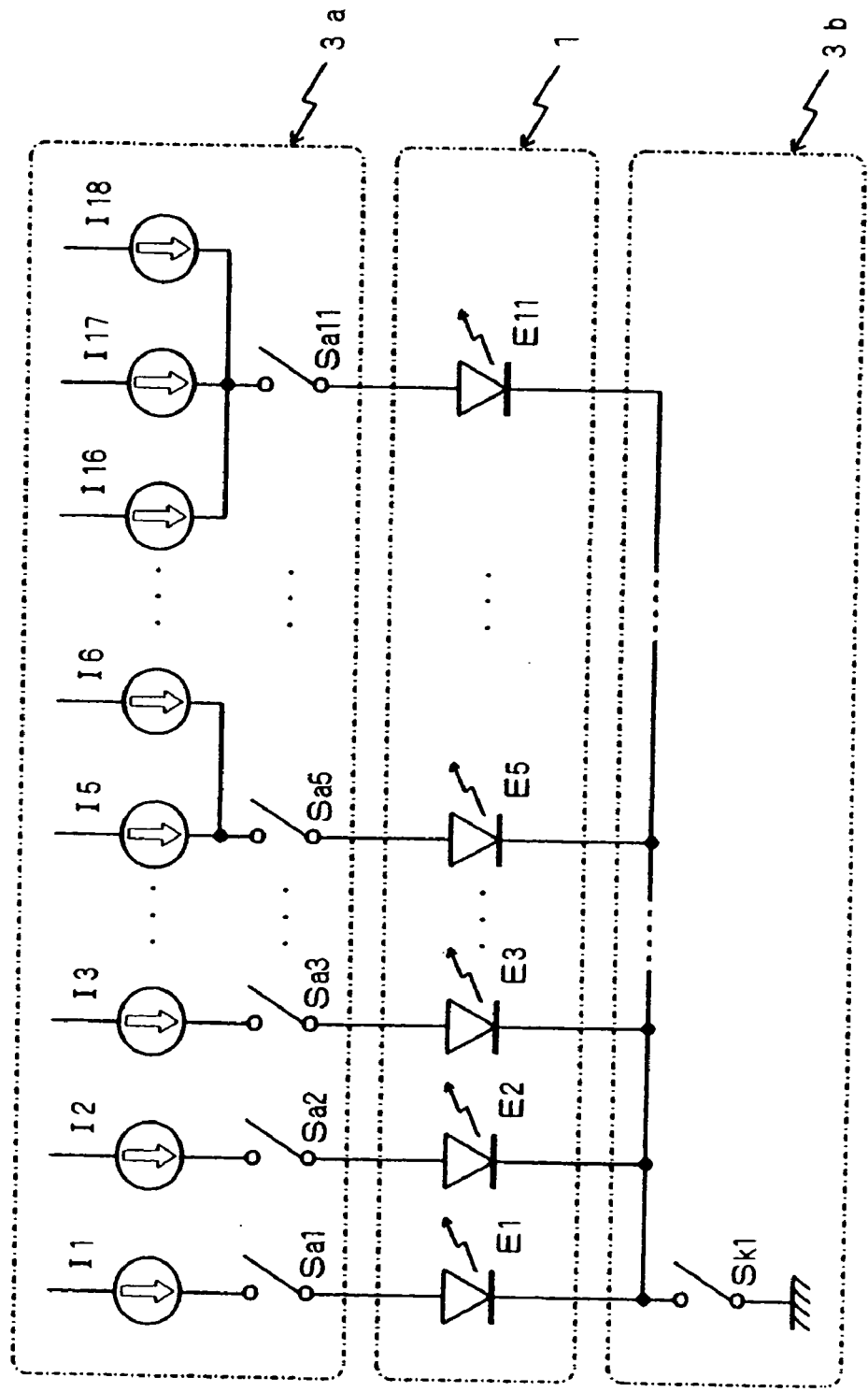
FIG. 2 is a circuit structure diagram showing an example in which current values necessary for driving and lighting respective icons are obtained.

A drive device of a light emitting element according to the present invention will be described below with reference to embodiments shown in the drawings. In the embodiments described below, organic EL elements are employed as elements which are driven to be lit, and an example of a case where these elements form the icon patterns described with reference to FIG. 1 will be described. In the respective drawings described below, parts by which the same functions are achieved are designated by the same reference characters, and therefore redundant description will be omitted appropriately.

Figure 3:
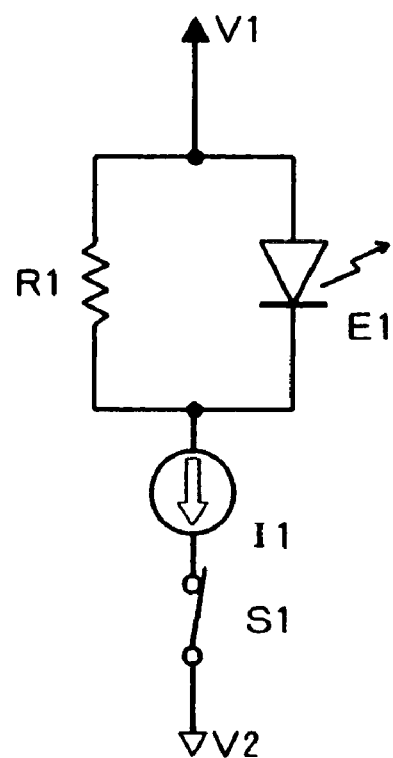
FIG. 3 is a circuit structure diagram showing a first embodiment of a drive device according to the present invention.

First, FIG. 3 shows a first embodiment that is a most basic structure of a drive device according to the present invention, and this corresponds to a series connection structure which is specifically designated by (1) in the invention shown in claim 1 and claim 15. That is, an EL element E1 as a light emitting element forms one of icon patterns shown in FIG. 1, wherein while the anode side of this EL element E1 is connected to a first potential V1, the cathode side of this EL element E1 is connected to the current absorption side of the constant current source I1, and the current output side of the constant current source I1 is connected to a second potential V2 whose electrical potential is lower than the first potential via a light emission control switch S1.

A current regulating resistor R1 is connected in parallel to the EL element E1, and by selecting the value of this current regulating resistor R1, lighting drive current supplied to the EL element E1 is regulated. That is, in the state shown in FIG. 3, current flowing from the first potential V1 to the second potential V2 is set by the constant current source I1. By selecting the resistance value of the current regulating resistor R1, current value flowing in the resister R1 can be regulated, and as a result, current of the value obtained by subtracting the current value flowing in the current regulating resistor R1 from the current value determined by the constant current source I1 is supplied to the EL element E1.

Here, the potential difference between the first potential V1 and the second potential V2 is set at a value which is higher than the above-mentioned light emission threshold voltage (Vth) of the EL element E1, and therefore by allowing the light emission control switch S1 to be turned on as shown in FIG. 3, the EL element E1 forming an icon pattern can be lit. The structure shown in FIG. 3 shows a structure by which one icon pattern is driven to be lit, and this is similarly constructed for other icon patterns.

Accordingly, with the drive device provided with the structure shown in FIG. 3, by appropriately selecting the resistance value of the current regulating resistor based on the area of the EL element E1 forming an icon pattern and on a light emission efficiency responsive to an emission color, regulation can be performed such that the light emission intensity of the icon pattern by the EL element E1 becomes appropriate. At this time, it is possible to regulate balance of light emission intensities with respect to other icon patterns mutually.

Therefore, as a driver IC which drives and lights respective EL elements which form icon patterns, without preparing a custom IC for each light emitting module, an all-purpose driver IC can be utilized. Since intensity control of respective icons can be performed by a current regulating resistor, when for example dimmer control of all icons is performed by lighting time at multiple levels, such dimmer control can be realized by relatively simply time-dividing the lighting time of the respective icons.

Figure 4:
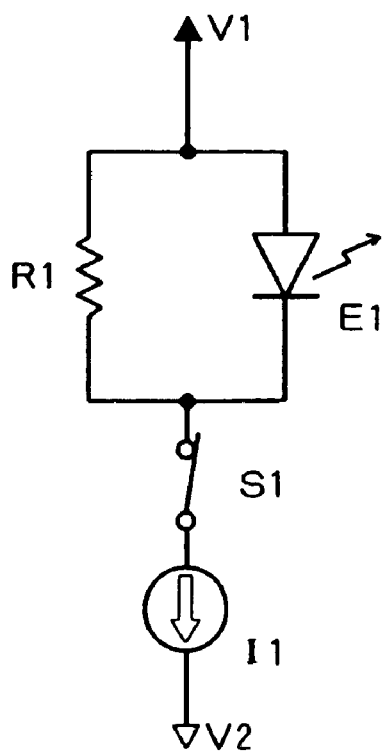
FIG. 4 similarly is a circuit structure diagram showing a second embodiment.

FIG. 4 shows a second embodiment that is a most basic structure of a drive device according to the present invention, and this corresponds to a series connection structure which is specifically designated by (2) in the invention shown in claim 1 and claim 15. That is, the EL element E1, the light emission control switch S1, and the constant current source I1 are connected in series in this order between the first potential V1 and the second potential V2 whose potential is lower than this first potential V1.

The EL element E1 forms one of icon patterns shown in FIG. 1, wherein the current regulating resistor R1 is connected in parallel to the EL element E1, and the value of this current regulating resistor R1 is selected so that the lighting drive current supplied to the EL element E1 can be regulated. This FIG. 4 shows a structure for driving and lighting one icon pattern, and this is similarly constructed for other icon patterns.

Compared to the circuit structure of the drive device shown in FIG. 3, the drive device provided with the structure shown in FIG. 4 is one in which the connection arrangement positions of the constant current source I1 which is connected in series between the first and second potentials V1, V2 and the light emission control switch S1 are replaced. Therefore, in the embodiment shown in FIG. 4 also, operations and effects similar to those of the embodiment shown in FIG. 3 can be obtained.

Figure 5:
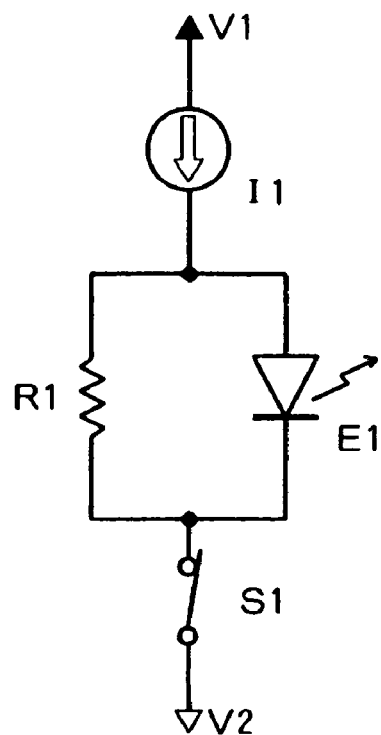
FIG. 5 similarly is a circuit structure diagram showing a third embodiment.

FIG. 5 shows a third embodiment that is a most basic structure of a drive device according to the present invention, and this corresponds to a series connection structure which is specifically designated by (3) in the invention shown in claim 1 and claim 15. That is, the constant current source I1, the EL element E1, and the light emission control switch S1 are connected in series in this order between the first potential V1 and the second potential V2 whose potential is lower than this first potential V1.

The EL element E1 forms any of icon patterns shown in FIG. 1, wherein the current regulating resistor R1 is connected in parallel to the EL element E1, and the value of this current regulating resistor R1 is selected so that the lighting drive current supplied to the EL element E1 can be regulated. This FIG. 5 shows a structure for driving and lighting one icon pattern, and this is similarly constructed for other icon patterns. In the drive device provided with the structure shown in FIG. 5 also, operations and effects similar to those of the embodiment shown in FIGS. 3 and 4 can be obtained.

Figure 6:
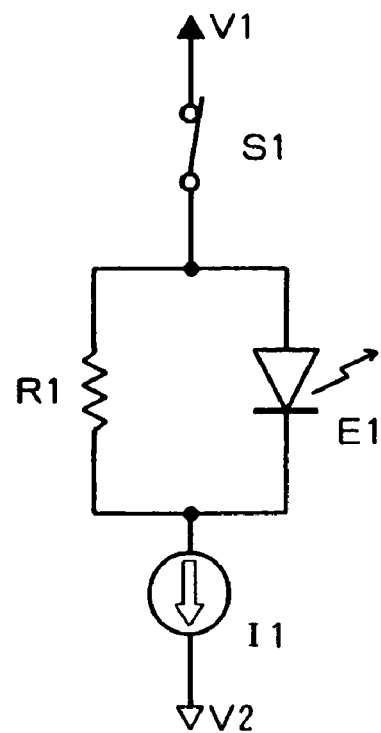
FIG. 6 similarly is a circuit structure diagram showing a fourth embodiment.

FIG. 6 shows a fourth embodiment that is a most basic structure of a drive device according to the present invention, and this corresponds to a series connection structure which is specifically designated by (4) in the invention shown in claim 6 and claim 17. That is, the light emission control switch S1, the EL element E1, and the constant current source I1 are connected in series in this order between the first potential V1 and the second potential V2 whose potential is lower than this first potential V1.

The EL element E1 forms one of icon patterns shown in FIG. 1, wherein the current regulating resistor R1 is connected in parallel to the EL element E1, and the value of this current regulating resistor R1 is selected so that the lighting drive current supplied to the EL element E1 can be regulated. This FIG. 6 shows a structure for driving and lighting one icon pattern, and this is similarly constructed for other icon patterns. In the drive device provided with the structure shown in FIG. 6 also, operations and effects similar to those of the embodiment shown in FIGS. 3 to 5 can be obtained.

Figure 7:
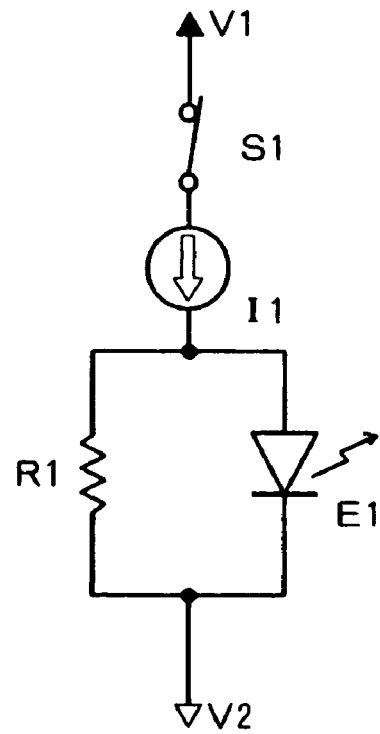
FIG. 7 similarly is a circuit structure diagram showing a fifth embodiment.

FIG. 7 shows a fifth embodiment that is a most basic structure of a drive device according to the present invention, and this corresponds to a series connection structure which is specifically designated by (5) in the invention shown in claim 6 and claim 17. That is, the light emission control switch S1, the constant current source I1, and the EL element E1 are connected in series in this order between the first potential V1 and the second potential V2 whose potential is lower than this first potential V1.

The EL element E1 forms one of icon patterns shown in FIG. 1, wherein the current regulating resistor R1 is connected in parallel to the EL element E1, and the value of this current regulating resistor R1 is selected so that the lighting drive current supplied to the EL element E1 can be regulated. This FIG. 7 shows a structure for driving and lighting one icon pattern, and this is similarly constructed for other icon patterns. In the drive device provided with the structure shown in FIG. 7 also, operations and effects similar to those of the embodiment shown in FIGS. 3 to 6 can be obtained.

Figure 8:
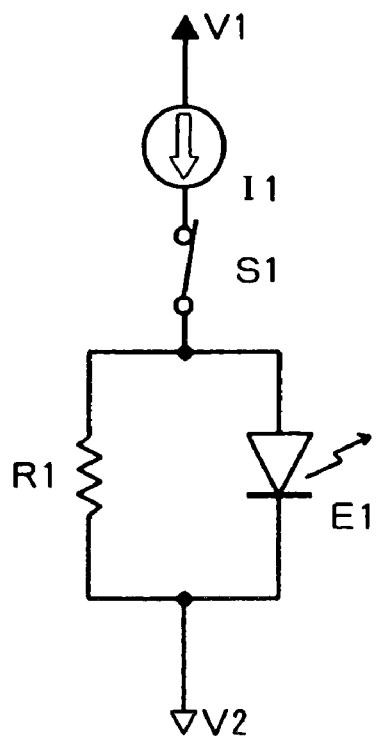
FIG. 8 similarly is a circuit structure diagram showing a sixth embodiment.

FIG. 8 shows a sixth embodiment that is a most basic structure of a drive device according to the present invention, and this corresponds to a series connection structure which is specifically designated by (6) in the invention shown in claim 6 and claim 17. That is, the constant current source I1, the light emission control switch S1, and the EL element E1 are connected in series in this order between the first potential V1 and the second potential V2 whose potential is lower than this first potential V1.

The EL element E1 forms one of icon patterns shown in FIG. 1, wherein the current regulating resistor R1 is connected in parallel to the EL element E1, and the value of this current regulating resistor R1 is selected so that the lighting drive current supplied to the EL element E1 can be regulated. This FIG. 8 shows a structure for driving and lighting one icon pattern, and this is similarly constructed for other icon patterns. In the drive device provided with the structure shown in FIG. 8 also, operations and effects similar to those of the embodiment shown in FIGS. 3 to 7 can be obtained.

Figure 9:
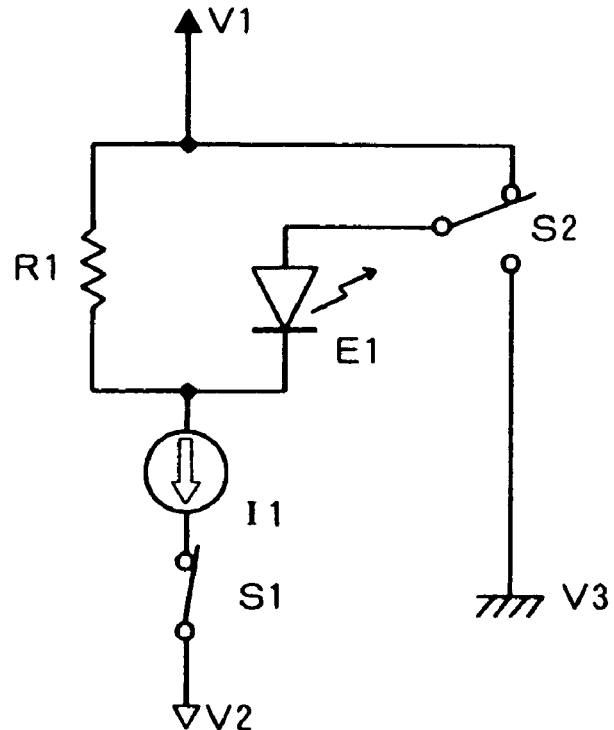
FIG. 9 similarly is a circuit structure diagram showing a seventh embodiment.

Next, FIG. 9 shows a seventh embodiment of a drive device according to the present invention, and this corresponds to the invention shown in claim 2 and claim 16. The structure shown in this FIG. 9 also shows an example in which one icon pattern is driven to be lit, and this is similarly constructed for other icon patterns. In the structure shown in this FIG. 9, a reverse bias applying switch S2 is provided in the anode side of the EL element E1 so that the anode side of the EL element E1 is switched and connected to a third potential V3 (ground potential in the embodiment) whose potential is lower than the first potential V1.

In this structure, compared to the structure shown in FIG. 3, the reverse bias applying switch S2 is added, and in the state in which the reverse bias applying switch S2 is connected to the first potential V1 side as shown in FIG. 9, this structure is the same circuit structure as that of FIG. 3. Accordingly, with the state shown in FIG. 9, operations and effects similar to those of the structure shown in FIG. 3 already described can be obtained.

During for example one frame period (or one subframe period) during which the display panel is driven to be lit, an all extinction period during which the respective EL elements are all extinguished is provided. During that all extinction period, the light emission control switch S1 is turned off, and the reverse bias applying switch S2 is connected to the ground potential side that is the third potential V3. Therefore, the electrical potential by the first potential V1 is applied to the cathode of the EL element E1 via the current regulating resistor R1, and the third potential V3 is applied to the anode of the EL element E1 via the reverse bias applying switch S2. Thus, the reverse bias voltage is applied to the EL element E1 which functions as an icon.

With the embodiment shown in FIG. 9, operations and effects similar to those of the structure shown in FIG. 3 already described can be obtained, and the reverse bias voltage is applied to the EL element E1 which functions as an icon during the all extinction period. Thus, the light emission lifetime of the EL element E1 can be prolonged.

Figure 10:
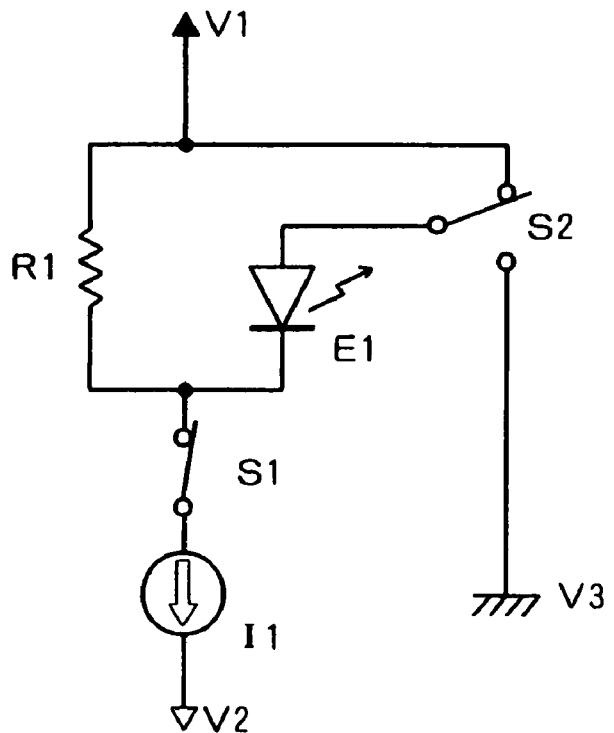
FIG. 10 similarly is a circuit structure diagram showing an eighth embodiment.

FIG. 10 shows an eighth embodiment of a drive device according to the present invention, and this similarly corresponds to the invention shown in claim 2 and claim 16. The structure shown in this FIG. 10 also shows an example in which one icon pattern is driven to be lit, and this is similarly constructed for other icon patterns. When the structure shown in this FIG. 10 is compared to the structure shown in FIG. 4, the reverse bias applying switch S2 is added, and in the state in which this reverse bias applying switch S2 is connected to the first potential V1 side as shown in FIG. 10, this structure is the same circuit structure as that of FIG. 4.

Accordingly, with the state shown in FIG. 10, operations and effects similar to those of the structure shown in FIG. 4 already described can be obtained. During the all extinction period, the light emission control switch S1 is turned off, and the reverse bias applying switch S2 is connected to the ground potential side that is the third potential V3. Therefore, the electrical potential by the first potential V1 is applied to the cathode of the EL element E1 via the current regulating resistor R1, and the electrical potential V3 of the third potential is applied to the anode of the EL element E1 via the reverse bias applying switch S2. Thus, the reverse bias voltage is applied to the EL element E1 which functions as an icon.

With the embodiment shown in FIG. 10, operations and effects similar to those of the structure shown in FIG. 4 already described can be obtained, and the reverse bias voltage is applied to the EL element E1 which functions as an icon during the all extinction period. Thus, the light emission lifetime of the EL element E1 can be prolonged.

Figure 11:
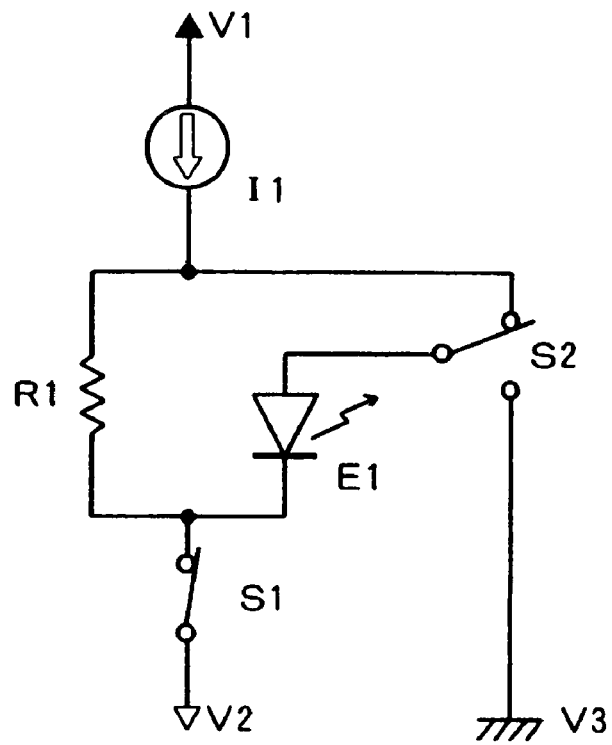
FIG. 11 similarly is a circuit structure diagram showing a ninth embodiment.

FIG. 11 shows a ninth embodiment of a drive device according to the present invention, and this similarly corresponds to the invention shown in claim 2 and claim 16. The structure shown in this FIG. 11 also shows an example in which one icon pattern is driven to be lit, and this is similarly constructed for other icon patterns. When the structure shown in this FIG. 11 is compared to the structure shown in FIG. 5, the reverse bias applying switch S2 is added, and in the state in which this reverse bias applying switch S2 is connected to the first potential V1 side as shown in FIG. 11, this structure is the same circuit structure as that of FIG. 5.

Accordingly, with the state shown in FIG. 11, operations and effects similar to those of the structure shown in FIG. 5 already described can be obtained. During the all extinction period, the light emission control switch S1 is turned off, and the reverse bias applying switch S2 is connected to the ground potential side that is the third potential V3. Therefore, the electrical potential by the first potential V1 is applied to the cathode of the EL element E1 via the constant current source I1 and the current regulating resistor R1, and the electrical potential V3 of the third potential is applied to the anode of the EL element E1 via the reverse bias applying switch S2. Thus, the reverse bias voltage is applied to the EL element E1 which functions as an icon.

With the embodiment shown in FIG. 11, operations and effects similar to those of the structure shown in FIG. 5 already described can be obtained, and the reverse bias voltage is applied to the EL element E1 which functions as an icon during the all extinction period. Thus, the light emission lifetime of the EL element E1 can be prolonged.

Figure 12:
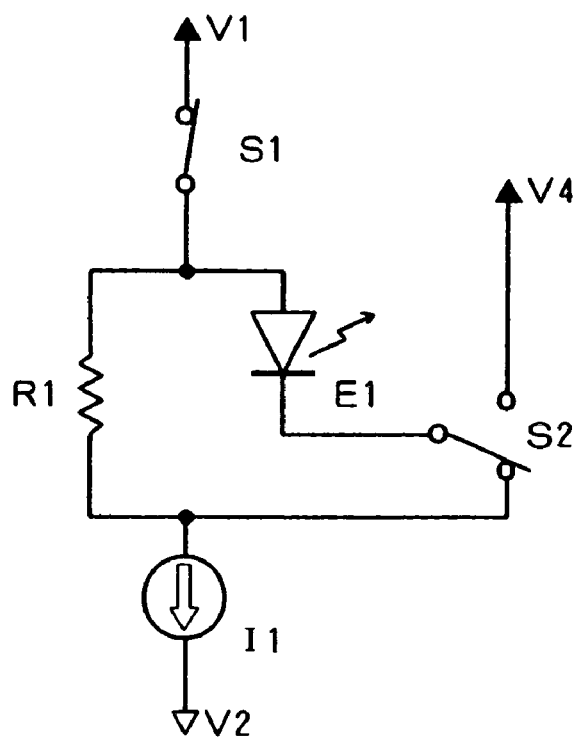
FIG. 12 similarly is a circuit structure diagram showing a tenth embodiment.

FIG. 12 shows a tenth embodiment of a drive device according to the present invention, and this corresponds to the invention shown in claim 7 and claim 18. The structure shown in this FIG. 12 also shows an example in which one icon pattern is driven to be lit, and this is similarly constructed for other icon patterns. In the structure shown in this FIG. 12, the reverse bias applying switch S2 is provided in the cathode side of the EL element E1 so that the cathode side of the EL element E1 is switched and connected to a fourth potential V4 whose potential is higher than the second potential V2.

When the structure shown in this FIG. 12 is compared to the structure shown in FIG. 6, the reverse bias applying switch S2 is added, and in the state in which this reverse bias applying switch S2 is connected to the constant current source I1 side as shown in FIG. 12, this structure is the same circuit structure as that of FIG. 6. Accordingly, with the state shown in FIG. 12, operations and effects similar to those of the structure shown in FIG. 6 already described can be obtained.

During the all extinction period, the light emission control switch S1 is turned off, and the reverse bias applying switch S2 is connected to the fourth potential V4 side. Therefore, the electrical potential by the second potential V2 is applied to the anode of the EL element E1 via the current regulating resistor R1 and the constant current source I1, and the electrical potential V4 of the fourth potential is applied to the cathode of the EL element E1 via the reverse bias applying switch S2. Thus, the reverse bias voltage is applied to the EL element E1 which functions as an icon.

With the embodiment shown in FIG. 12, operations and effects similar to those of the structure shown in FIG. 6 already described can be obtained, and the reverse bias voltage is applied to the EL element E1 which functions as an icon during the all extinction period. Thus, the light emission lifetime of the EL element E1 can be prolonged.

Figure 13:
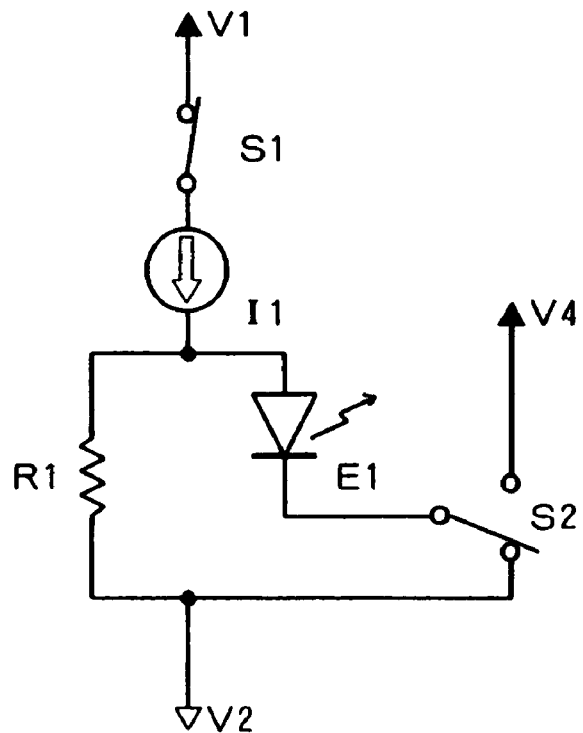
FIG. 13 similarly is a circuit structure diagram showing an eleventh embodiment.

FIG. 13 shows an eleventh embodiment of a drive device according to the present invention, and this similarly corresponds to the invention shown in claim 7 and claim 18. The structure shown in this FIG. 13 also shows an example in which one icon pattern is driven to be lit, and this is similarly constructed for other icon patterns. When the structure shown in this FIG. 13 is compared to the structure shown in FIG. 7, the reverse bias applying switch S2 is added, and in the state in which this reverse bias applying switch S2 is connected to the second potential V2 as shown in FIG. 13, this structure is the same circuit structure as that of FIG. 7. Accordingly, with the state shown in FIG. 13, operations and effects similar to those of the structure shown in FIG. 7 already described can be obtained.

During the all extinction period, the light emission control switch S1 is turned off, and the reverse bias applying switch S2 is connected to the fourth potential V4 side. Therefore, the electrical potential by the second potential V2 is applied to the anode of the EL element E1 via the current regulating resistor R1, and the electrical potential V4 of the fourth potential is applied to the cathode of the EL element E1 via the reverse bias applying switch S2. Thus, the reverse bias voltage is applied to the EL element E1 which functions as an icon.

With the embodiment shown in FIG. 13, operations and effects similar to those of the structure shown in FIG. 7 already described can be obtained, and the reverse bias voltage is applied to the EL element E1 which functions as an icon during the all extinction period. Thus, the light emission lifetime of the EL element E1 can be prolonged.

Figure 14:
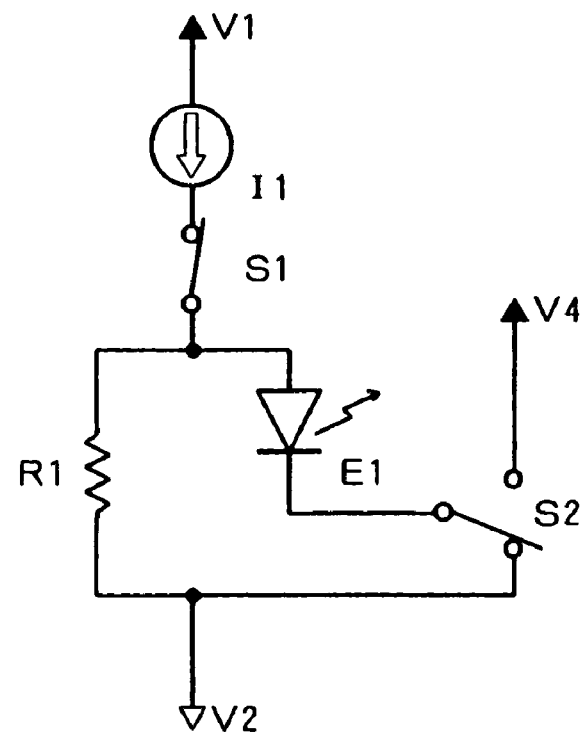
FIG. 14 similarly is a circuit structure diagram showing a twelfth embodiment.

FIG. 14 shows a twelfth embodiment of a drive device according to the present invention, and this similarly corresponds to the invention shown in claim 7 and claim 18. The structure shown in this FIG. 14 also shows an example in which one icon pattern is driven to be lit, and this is similarly constructed for other icon patterns. When the structure shown in this FIG. 14 is compared to the structure shown in FIG. 8, the reverse bias applying switch S2 is added, and in the state in which this reverse bias applying switch S2 is connected to the second potential V2 as shown in FIG. 14, this structure is the same circuit structure as that of FIG. 8. Accordingly, with the state shown in FIG. 14, operations and effects similar to those of the structure shown in FIG. 8 already described can be obtained.

During the all extinction period, the light emission control switch S1 is turned off, and the reverse bias applying switch S2 is connected to the fourth potential V4 side. Therefore, the electrical potential by the second potential V2 is applied to the anode of the EL element E1 via the current regulating resistor R1, and the electrical potential V4 of the fourth potential is applied to the cathode of the EL element E1 via the reverse bias applying switch S2. Thus, the reverse bias voltage is applied to the EL element E1 which functions as an icon.

With the embodiment shown in FIG. 14, operations and effects similar to those of the structure shown in FIG. 8 already described can be obtained, and the reverse bias voltage is applied to the EL element E1 which functions as an icon during the all extinction period. Thus, the light emission lifetime of the EL element E1 can be prolonged.

Figure 15:
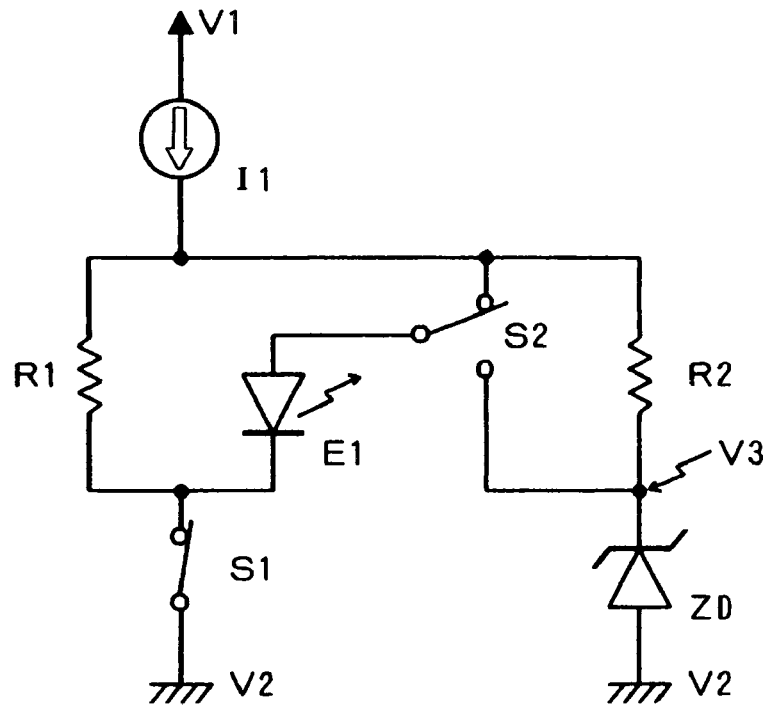
FIG. 15 similarly is a circuit structure diagram showing a thirteenth embodiment.

Next, FIG. 15 shows a thirteenth embodiment of a drive device according to the present invention, and this corresponds to the invention shown in claim 3 and claim 4. The structure shown in this FIG. 15 also shows a structure in which one icon pattern is driven to be lit, and this is similarly constructed for other icon patterns.

The structure shown in this FIG. 15 is similar to the structure shown in FIG. 11 basically, and the electrical potential at a third potential V3 employed for applying the reverse bias voltage is obtained at a connection point between a current supplying resistor R2 and a Zener diode ZD which are connected in series between the first potential V1 and the second potential V2.

In the embodiment shown in this FIG. 15, a second potential V2 is the ground potential, and thus the electrical potential corresponding to the Zener voltage by the Zener diode ZD is generated at the cathode of the Zener diode as the third potential V3. That is, the electrical potential V3 at the third potential is generated by the electrical potential at the first potential V1 and the electrical potential at the second potential V2.

During the all extinction period, the light emission control switch S1 is turned off, and the reverse bias applying switch S2 is switched to the third potential V3 side. As a result, the electrical potential by the first potential V1 is applied to the cathode of the EL element E1 via the constant current source I1 and the current regulating resistor R1, and the electrical potential V3 by the third potential is applied to the anode of the EL element E1 via the reverse bias applying switch S2. Thus, the reverse bias voltage is applied to the EL element E1 which functions as an icon.

Accordingly, with the embodiment shown in FIG. 15 also, operations and effects similar to those of the structure shown in FIG. 11 can be obtained. In addition, with the embodiment shown in FIG. 15, by selecting and utilizing the Zener voltage at the Zener diode ZD, the reverse bias voltage value which is applied to the EL element E1 can be regulated.

Figure 16:
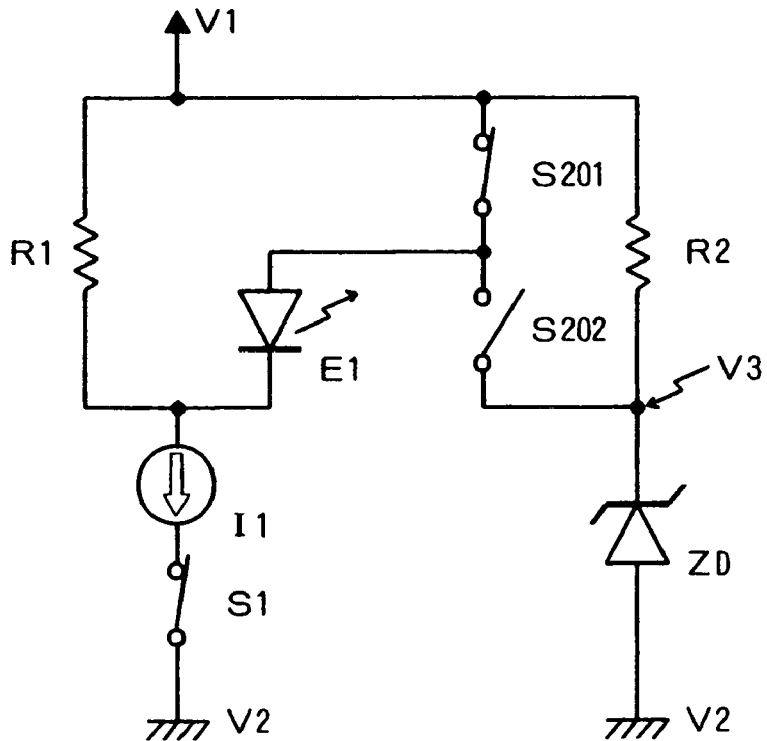
FIG. 16 similarly is a circuit structure diagram showing a fourteenth embodiment.

FIG. 16 shows a fourteenth embodiment of a drive device according to the present invention, and this similarly corresponds to the invention shown in claim 3 and claim 4. The structure shown in this FIG. 16 also shows a structure in which one icon pattern is driven to be lit, and this is similarly constructed for other icon patterns.

The structure shown in this FIG. 16 is similar to the structure shown in FIG. 9 basically, and the electrical potential at the third potential V3 employed for applying the reverse bias voltage is obtained at a connection point between a resistor R2 and a Zener diode ZD which are connected in series between the first potential V1 and the second potential V2.

In the embodiment shown in this FIG. 16 also, the second potential V2 is the ground potential, and thus the electrical potential corresponding to the Zener voltage by the Zener diode ZD is generated at the cathode of the Zener diode as the third potential V3. Therefore, the electrical potential V3 at the third potential is generated by the electrical potential at the first potential V1 and the electrical potential at the second potential V2 similarly.

In the embodiment shown in this FIG. 8, instead of the change-over type switch S2 as a reverse bias applying switch, a pair of analog switches S201, S202 which are turned on alternatively are constructed. The structure of this pair of analog switches S201, S202 also achieves the same function as that of the change-over type reverse bias applying switch S2 already described.

Therefore, with the embodiment shown in FIG. 16 also, operations and effects similar to those of the structure shown in FIG. 9 can be obtained. In addition, with the embodiment shown in FIG. 16, by selecting and utilizing the Zener voltage at the Zener diode ZD similarly to the embodiment shown in FIG. 15, the reverse bias voltage value which is applied to the EL element E1 can be regulated.

Figure 17:
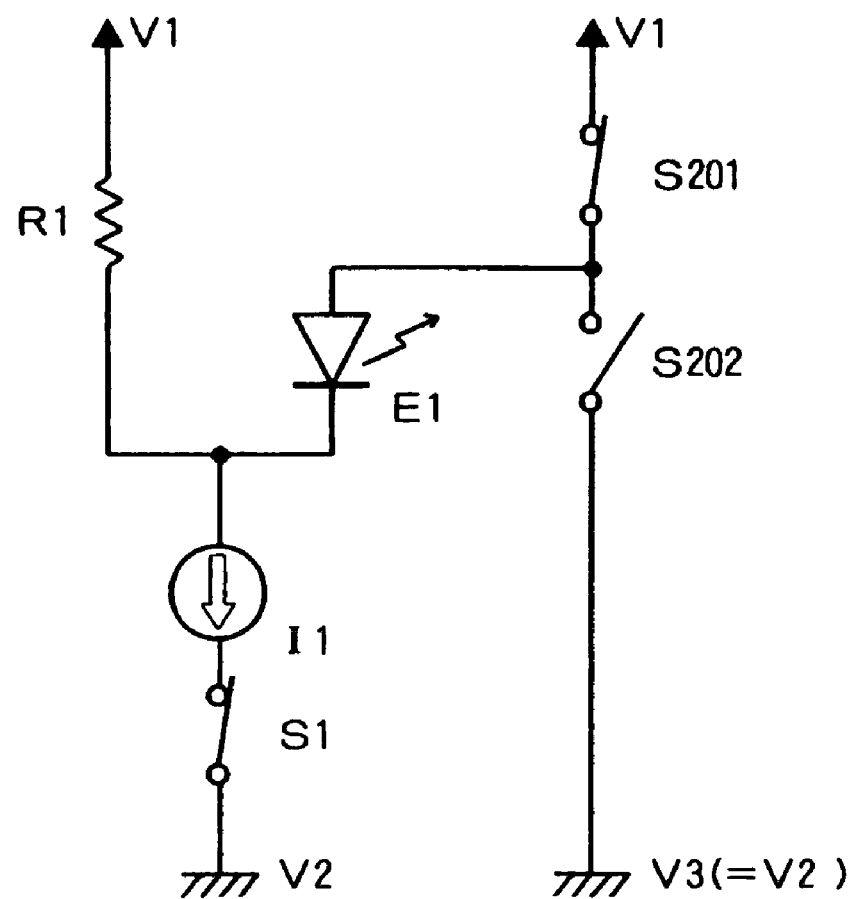
FIG. 17 similarly is a circuit structure diagram showing a fifteenth embodiment.

FIG. 17 shows a fifteenth embodiment of a drive device according to the present invention, and this corresponds to the invention shown in claim 5. The structure shown in this FIG. 17 also shows a structure in which one icon pattern is driven to be lit, and this is similarly constructed for other icon patterns.

The structure shown in this FIG. 17 is constructed in such a way that in the structure shown in FIG. 16, the ground potential that is the second potential V2 is utilized as the electrical potential V3 at the third potential which is for applying the reverse bias voltage to the EL element E1. That is, this embodiment is in a relationship that the electrical potential V3 of the third potential and the electrical potential V2 of the second potential are the same.

With the structure shown in this FIG. 17 also, by allowing the light emission control switch S1 and the analog switch S201 constituting the reverse bias applying switch to be turned on as shown in the drawing, the EL element E1 constituting an icon can be lit. Further, by allowing the light emission control switch S1 and the analog switch S201 to be turned off and the analog switch S202 to be turned on, the reverse bias voltage can be applied to the EL element E1. With the structure shown in this FIG. 17, the circuit structure thereof can be simplified compared to the structure shown in FIG. 16, and operations and effects approximately the same as those of the structure shown in FIG. 16 can be obtained.

Figure 18:
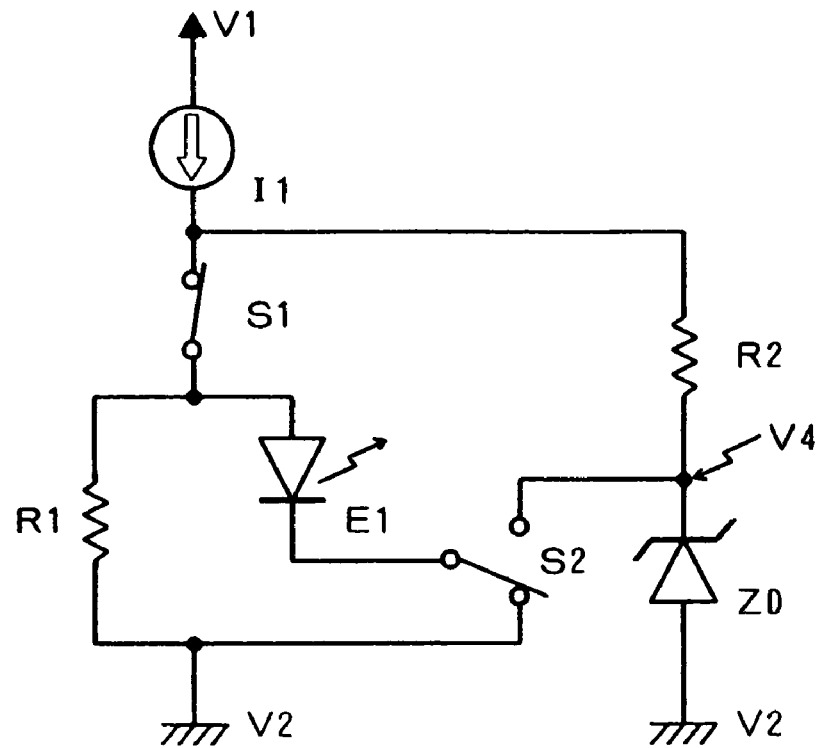
FIG. 18 similarly is a circuit structure diagram showing a sixteenth embodiment.

Next, FIG. 18 shows a sixteenth embodiment of a drive device according to the present invention, and this corresponds to the invention shown in claim 8 and claim 9. The structure shown in this FIG. 18 also shows a structure in which one icon pattern is driven to be lit, and this is similarly constructed for other icon patterns.

The structure shown in this FIG. 18 is similar to that shown in FIG. 14 basically, and is constructed such that the electrical potential at a fourth potential V4 employed for applying the reverse bias voltage is obtained at the connection point of the current supplying resistor R2 and the Zener diode ZD which are connected in series between the first potential V1 and the second potential V2.

In the embodiment shown in this FIG. 18, the second potential V2 is the ground potential, and thus the electrical potential corresponding to the Zener voltage by the Zener diode ZD is generated at the cathode of the Zener diode as the fourth potential V4. That is, the electrical potential V4 at the fourth potential is generated by the electrical potential at the first potential V1 and the electrical potential at the second potential V2.

During the all extinction period, the light emission control switch S1 is turned off, and the reverse bias applying switch S2 is switched to the fourth potential V4 side. As a result, the electrical potential by the second potential V2 is applied to the anode of the EL element E1 via the current regulating resistor R1, and the electrical potential V4 by the fourth potential is applied to the cathode of the EL element E1 via the reverse bias applying switch S2. Thus, the reverse bias voltage is applied to the EL element E1 which functions as an icon.

Accordingly, with the embodiment shown in FIG. 18 also, operations and effects similar to those of the structure shown in FIG. 14 can be obtained. In addition, with the embodiment shown in FIG. 18, by selecting and utilizing the Zener voltage at the Zener diode ZD, the reverse bias voltage value which is applied to the EL element E1 can be regulated.

Figure 19:
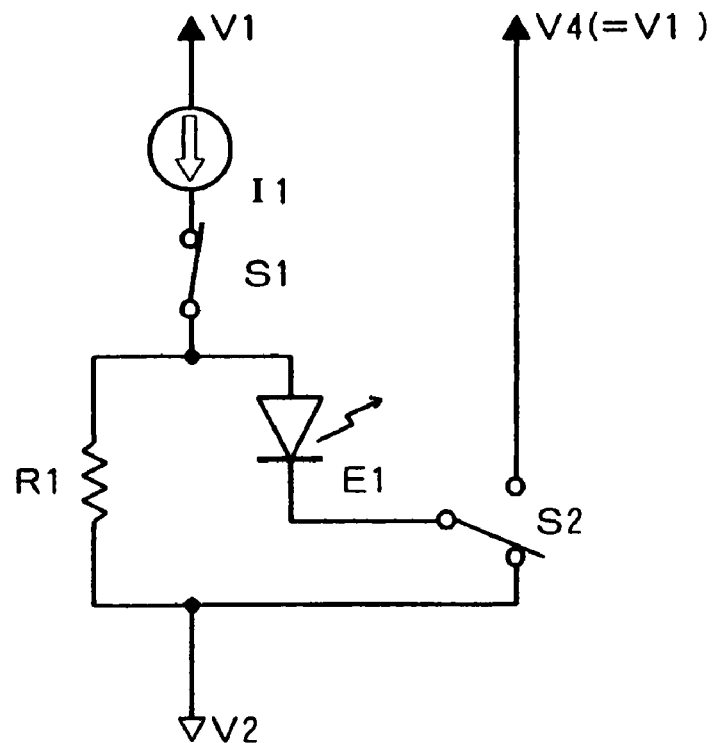
FIG. 19 similarly is a circuit structure diagram showing a seventeenth embodiment.

FIG. 19 shows a seventeenth embodiment of a drive device according to the present invention, and this corresponds to the invention shown in claim 10. The structure shown in this FIG. 19 also shows a structure in which one icon pattern is driven to be lit, and this is similarly constructed for other icon patterns.

The structure shown in this FIG. 19 is constructed in such a way that in the structure shown in FIG. 18, the first potential V1 is utilized as the electrical potential V4 at the fourth potential which is for applying the reverse bias voltage to the EL element E1. That is, this embodiment is in a relationship that the electrical potential V4 of the fourth potential and the electrical potential V1 of the first potential are equal.

With the structure shown in this FIG. 19 also, by allowing the light emission control switch S1 to be turned on and by allowing the reverse bias applying switch S2 to be connected to the second potential V2 side as shown in the drawing, the EL element E1 constituting an icon can be lit. Further, by allowing the light emission control switch S1 to be turned off and the reverse bias applying switch S2 to be connected to the fourth potential V4, that is, the first potential V1 side, the reverse bias voltage can be applied to the EL element E1. With the structure shown in this FIG. 19, the circuit structure thereof can be simplified compared to the structure shown in FIG. 18, and operations and effects approximately the same as those of the structure shown in FIG. 14 can be obtained.

Figure 20:
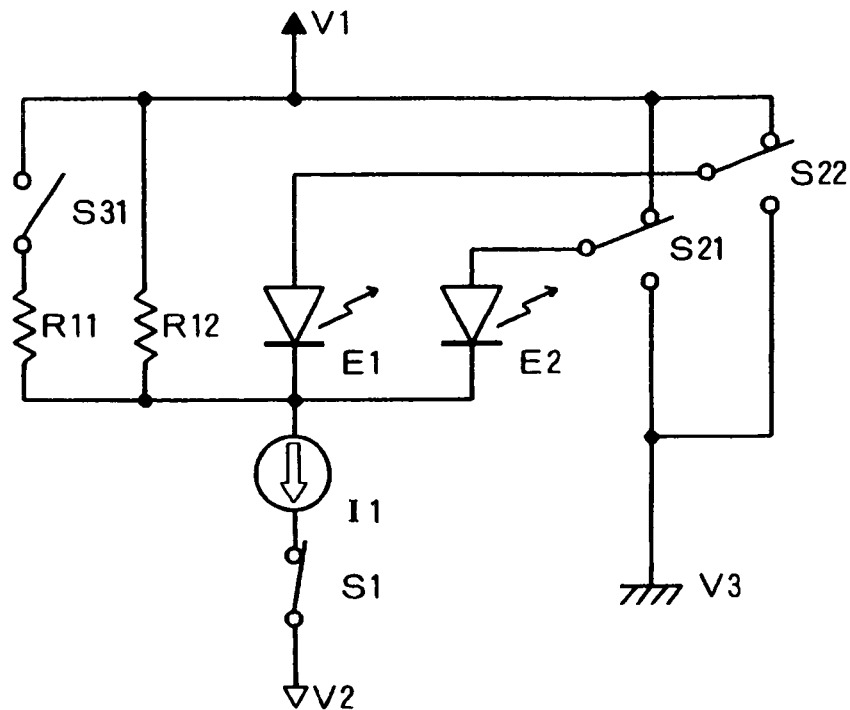
FIG. 20 similarly is a circuit structure diagram showing an eighteenth embodiment.

FIG. 20 shows an eighteenth embodiment of a drive device according to the present invention, and this corresponds to the invention shown in claim 12. The embodiment shown in this FIG. 20 can be appropriately utilized in a case where plural EL elements E1, E2 constituting icons whose light emitting areas or emission colors are different from each other are arranged on a display panel.

As already described, regarding EL elements whose light emitting areas or emission colors are different, in order to control the respective EL elements at appropriate light emission intensities, drive currents supplied to the respective EL elements E1, E2 are different. Thus, in the embodiment shown in FIG. 20, provided is a resistance value change-over switch S31 which can change the connection combination of current regulating resistors R11, R12 connected in parallel to the EL elements E1, E2.

In this embodiment, it is possible to select a state in which only the current regulating resistor R12 is connected to the EL elements E1, E2 and a state in which the parallel circuit of the current regulating resistors R11, R12 is connected to the EL elements E1, E2, in response to opening and closing operations of the resistance value change-over switch S31. In this embodiment also, by allowing the reverse bias applying switch S21, S22 to be connected to a third potential V3 (ground) side in the above-mentioned all extinction state, the reverse bias voltage can be applied to the EL elements E1, E2. Therefore, in the structure shown in FIG. 20 also, operations and effects approximately the same as those of the structure shown in FIGS. 9 to 19 already described can be obtained.

Figure 21:
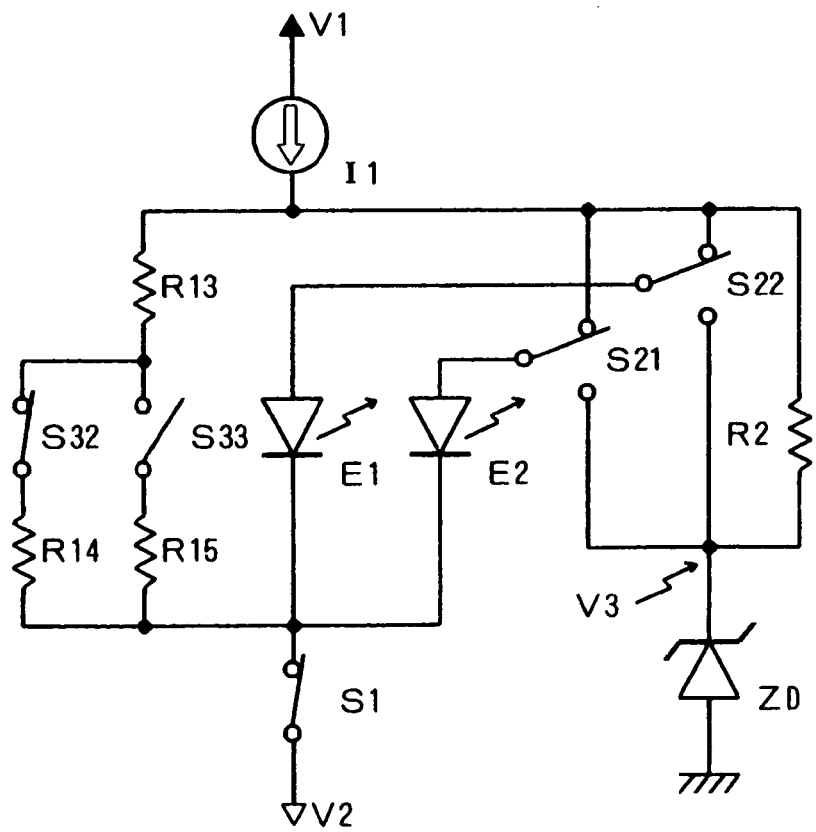
FIG. 21 similarly is a circuit structure diagram showing a nineteenth embodiment.

FIG. 21 shows a nineteenth embodiment of a drive device according to the present invention, and this also corresponds to the invention shown in claim 12. The embodiment shown in this FIG. 21 also can be appropriately utilized in a case where plural EL elements E1, E2 constituting icons whose light emitting areas or emission colors are different from each other are arranged on a display panel.

Differences between the structure shown in this FIG. 21 and the structure shown in FIG. 20 are that the constant current source I1 is arranged in the first potential V1 side, that current regulating resistors R13-R15 are switchable between series and series-parallel states by the combination of two resistance value change-over switches S32, S33, and that the third electrical potential V3 for applying the reverse bias voltage to the EL elements E1, E2 is generated by the resistor R2 and the Zener diode ZD similarly to the example shown in FIGS. 15 and 16. In the structure shown in this FIG. 21 also, basic operations and effects are the same as those of the embodiment shown in FIG. 20.

Figure 22:
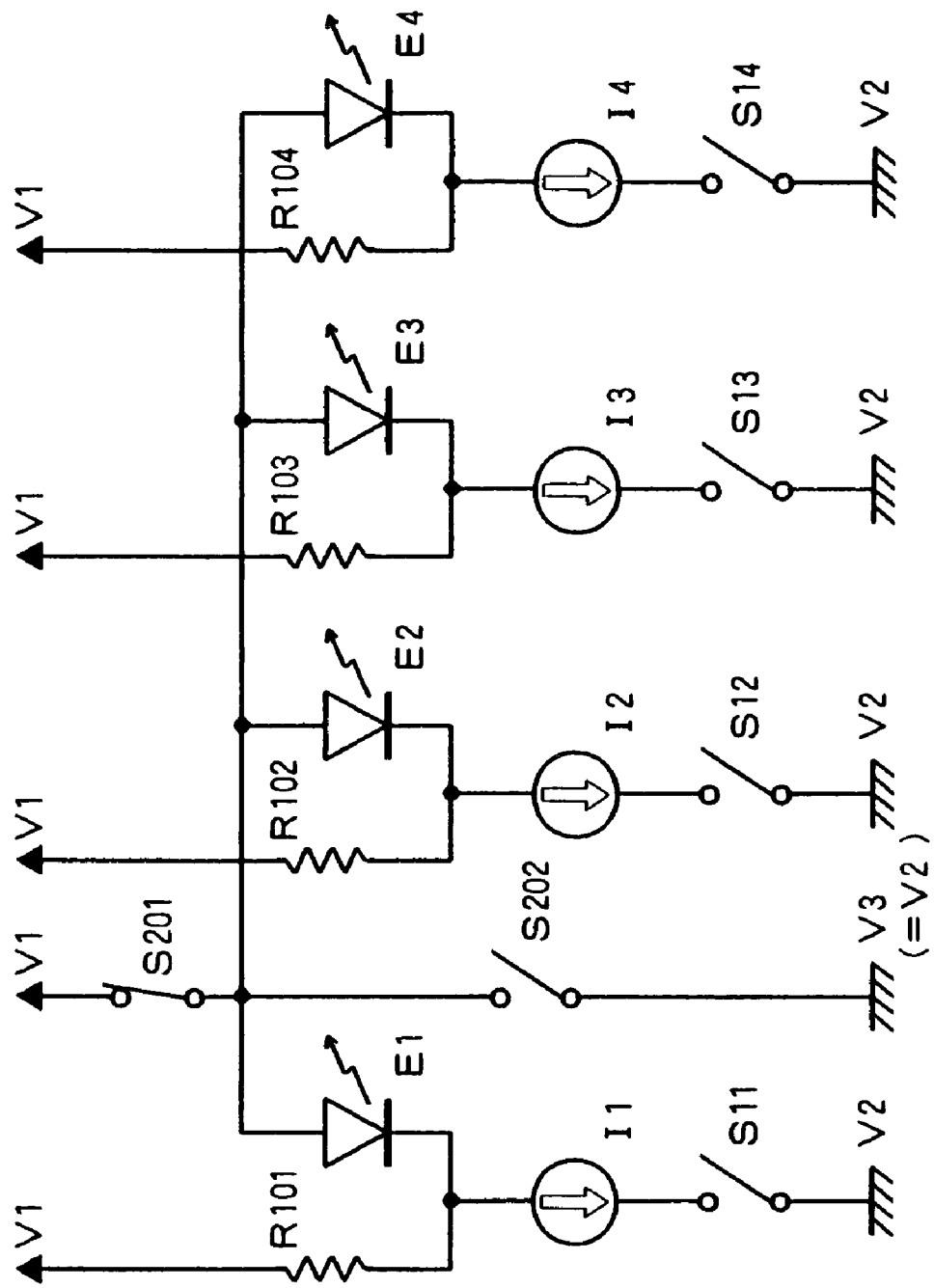
FIG. 22 similarly is a circuit structure diagram showing a twentieth embodiment.

FIG. 22 shows a twentieth embodiment of a drive device according to the present invention, and this corresponds to the invention shown in claim 13. The embodiment shown in this FIG. 20 is constructed in such a way that with respect to the embodiment shown in FIG. 17 already described, lighting drive circuits for plural EL elements are connected in parallel further. In FIG. 22, although the number of drive circuits which are connected in parallel is limited for convenience of illustration, more drive circuits can be connected.

With this structure, by allowing one of light emission control switches S11-S14 to be turned on, the EL elements E1-E4 constituting icons corresponding to these light emission control switches can be lit. In this case, in a case where light emitting areas or emission colors in the respective icons (EL elements E1-E4) are different from one another, by appropriately selecting values of current regulating resistors R101-R104 in response to the differences, light emission intensities of the respective EL elements E1-E4 can be set at appropriate states.

With the embodiment shown in FIG. 22, during the all extinction period, the light emission control switches S11-S14 and an analog switch S201 are turned off, and an analog switch S202 is turned on. Thus, anode sides of all EL elements E1-E4 are at the ground potential, and the reverse bias voltage can be applied to all EL elements E1-E4.

Although organic EL elements are employed as light emitting elements in the respective embodiments described above, other light emitting elements having a diode characteristic can also be utilized. A drive device of a light emitting element according to the present invention described above can be appropriately adopted in a display device of electronic equipment for example including a portable telephone, a portable digital assistant (PDA), a personal computer, or the like, and even in a case where the drive device is adopted in such electronic equipment, the above-described operations and effects can be produced as they are.

What is claimed is:

1. A drive device, comprising:
a light emitting element;
a constant current source; and
a light emission control switch,
wherein the light emitting element, the constant current source and the light emission control switch are connected in series between a first potential and a second potential whose electrical potential is lower than the first potential in any one order of
(1) the light emitting element, the constant current source, and the light emission control switch,
(2) the light emitting element, the light emission control switch, and the constant current source,
(3) the constant current source, the light emitting element, and the light emission control switch, and
wherein at least one current regulating resistor is connected in parallel to the light emitting element for regulating a current value flowing in the light emitting element, and
wherein the light emitting element has a diode characteristic and a reverse bias applying switch is provided in an anode side of the light emitting element so that the anode side of the light emitting element is switched and connected to a third potential whose electrical potential is lower than that of the first potential.

2. The drive device according to claim 1, characterized by being constructed in such a way that the electrical potential at the third potential is generated by the electrical potential at the first potential and the electrical potential at the second potential.

3. The drive device according to claim 2, characterized by being constructed in such a way that the electrical potential at the third potential is obtained at a connection point of a resistor and a Zener diode which are connected in series between the first potential and the second potential.

4. The drive device according to claim 1, characterized in that the electrical potential at the third potential and the electrical potential at the second potential are equal.

5. A drive device, comprising:
a light emitting element;
a constant current source; and
a light emission control switch;
wherein the light emitting element, the constant current source and the light emission control switch are connected in series between a first potential and a second potential whose electrical potential is lower than the first potential in any one order of
(4) the light emission control switch, the light emitting element, and the constant current source,
(5) the light emission control switch, the constant current source, and the light emitting element,
(6) the constant current source, the light emission control switch, and the light emitting element,
wherein at least one current regulating resistor is connected in parallel to the light emitting element for regulating a current value flowing in the light emitting element, and
wherein the light emitting element has a diode characteristic and a reverse bias applying switch is provided in a cathode side of the light emitting element so that the cathode side of the light emitting element is switched and connected to a fourth potential whose electrical potential is higher than that of the second potential.

6. The drive device according to claim 5, characterized by being constructed in such a way that the electrical potential at the fourth potential is generated by the electrical potential at the first potential and the electrical potential at the second potential.

7. The drive device according to claim 6, characterized by being constructed in such a way that the electrical potential at the fourth potential is obtained at a connection point of a resistor and a Zener diode which are connected in series between the first potential and the second potential.

8. The drive device according to claim 5, characterized in that the electrical potential at the fourth potential and the electrical potential at the first potential are equal.

9. A drive method for driving a light emitting device, the light emitting device including a light emitting element, a constant current source, and a light emission control switch, comprising:

connecting the light emitting element, the constant current source and the light emission control switch in series between a first potential and a second potential whose electrical potential is lower than the first potential in any one order of
(1) the light emitting element, the constant current source, and the light emission control switch,
(2) the light emitting element, the light emission control switch, and the constant current source, and
(3) the constant current source, the light emitting element, and the light emission control switch;

selecting a resistance value of a current regulating resistor connected in parallel to the light emitting element so that a light emission drive current given to the light emitting element is regulated; and switching and connecting an anode side of the light emitting element having a diode characteristic to a third potential whose electrical point is lower than the first potential in a non-lighting state of the light emitting element in which the light emission control switch is controlled to be turned off to apply a reverse bias voltage to the light emitting element.

10. A drive method for driving a light emitting device, the light emitting device including a light emitting element, a constant current source, and a light emission control switch, comprising:

connecting the light emitting element, the constant current source and the light emission control switch in series between a first potential and a second potential whose electrical potential is lower than the first potential in any one order of
(4) the light emission control switch, the light emitting element, and the constant current source,
(5) the light emission control switch, the constant current source, and the light emitting element, and
(6) the constant current source, the light emission control switch, and the light emitting element;

selecting a resistance value of a current regulating resistor connected in parallel to the light emitting element so that a light emission drive current given to the light emitting element is regulated; and switching and connecting the cathode side of the light emitting element having a diode characteristic to a fourth potential whose electrical point is higher than the second potential in a non-lighting state of the light emitting element in which the light emission control switch is controlled to be turned off to apply a reverse bias voltage to the light emitting element.

* * * * *